US012758887B2

(12) United States Patent
Jordan et al.

(10) Patent No.: US 12,758,887 B2
(45) Date of Patent: Oct. 13, 2026

(54) SYSTEMS AND METHODS FOR STORING PLAYER STATE CACHES LOCALLY ON RIDE VEHICLES

(71) Applicant: Universal City Studios LLC, Universal City, CA (US)

(72) Inventors: Robert Michael Jordan, Orlando, FL (US); Mark James Traynor, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 657 days.

(21) Appl. No.: 18/190,618

(22) Filed: Mar. 27, 2023

(65) Prior Publication Data

US 2023/0321552 A1 Oct. 12, 2023

Related U.S. Application Data

(60) Provisional application No. 63/328,595, filed on Apr. 7, 2022.

(51) Int. Cl.

| | |
|---|---|
| ***A63G 7/00*** | (2006.01) |
| ***A63F 13/32*** | (2014.01) |
| ***A63F 13/79*** | (2014.01) |

(52) U.S. Cl.

CPC ................ *A63G 7/00* (2013.01); *A63F 13/32* (2014.09); *A63F 13/79* (2014.09); *A63F 2300/404* (2013.01); *A63F 2300/5546* (2013.01)

(58) Field of Classification Search

CPC .......... A63G 31/16; A63G 31/00; A63G 7/00; A63G 33/00; A63G 31/02; G06F 3/04815; G06F 12/00; G06F 12/0802; G06F 12/0804; G06F 12/0868; G06F 2212/251; G06F 2212/2515; G02B 27/017; A63F 13/79; A63F 13/65; A63F 13/32; A63F 13/67; A63F 2300/404; A63F 2300/516; A63F 2300/5546

USPC ............................................... 104/53; 463/43

See application file for complete search history.

(56) References Cited

U.S. PATENT DOCUMENTS

| | | | |
|---|---|---|---|
| 7,955,168 | B2 | 6/2011 | Mendelsohn et al. |
| 9,943,769 | B2 | 4/2018 | Comploi |
| 10,279,274 | B1 | 5/2019 | Brister et al. |
| 10,289,194 | B2 | 5/2019 | McCracken et al. |
| 10,528,123 | B2 | 1/2020 | McCracken et al. |
| 2016/0335802 | A1 | 11/2016 | Bradski |

(Continued)

OTHER PUBLICATIONS

PCT/US2023/017614 International Search Report and Written Opinion mailed Jun. 27, 2023.

*Primary Examiner* — S. Joseph Morano
*Assistant Examiner* — Heaven R Buffington
(74) *Attorney, Agent, or Firm* — Fletcher Yoder P.C.

(57) ABSTRACT

Systems and methods presented herein include ride vehicles configured to locally store player state caches. For example, ride vehicles may include an on-board ride and game control sub-system configured to control local features of a ride and game control system associated with an amusement park ride system (e.g., that occur locally on the ride vehicles), to locally cache player state data for riders of the ride vehicles during ride cycles of the ride vehicles, and to synchronize the locally-cached player state data with global player state data maintained by an off-board ride and game control sub-system after the ride cycles of the ride vehicles.

18 Claims, 5 Drawing Sheets

(56) References Cited

U.S. PATENT DOCUMENTS

| | | | | |
|---|---|---|---|---|
| 2019/0004598 | A1 | 1/2019 | Gordt et al. | |
| 2019/0201806 | A1 | 7/2019 | Weston | |
| 2019/0220636 | A1 | 7/2019 | Yeh et al. | |
| 2020/0098190 | A1 * | 3/2020 | Goergen | A63G 31/16 |
| 2020/0171397 | A1 * | 6/2020 | Krauthamer | A63G 25/00 |

* cited by examiner

SYSTEMS AND METHODS FOR STORING PLAYER STATE CACHES LOCALLY ON RIDE VEHICLES

CROSS-REFERENCE TO RELATED APPLICATION

This application claims priority to and the benefit of U.S. Provisional Application No. 63/328,595, entitled "SYSTEMS AND METHODS FOR STORING PLAYER STATE CACHES LOCALLY ON RIDE VEHICLES," filed Apr. 7, 2022, which is hereby incorporated by reference in its entirety for all purposes.

BACKGROUND

The present disclosure relates generally to the field of amusement parks. More specifically, embodiments of the present disclosure relate to systems and methods for storing player state caches locally on ride vehicles.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks may include various entertainment attractions in providing enjoyment to guests of the amusement parks. For example, the attractions may include a ride attraction (e.g., closed-loop track, dark ride, thrill ride, or other similar ride). In such ride attractions, motion of a ride vehicle consists of programmed movements or the ride vehicle may include features (e.g., various buttons and knobs) that provide a passenger with varying levels of control over the ride vehicle. It is now recognized that there is a need for an improved ride attraction that provides enhanced passenger control over the ride vehicle to create a more interactive ride experience, and to enable game data to be updated more rapidly to enhance the ride experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, an amusement park ride system includes an off-board ride and game control sub-system configured to control global features of a ride and game control system associated with the amusement park ride system. In addition, the amusement park ride system includes one or more ride vehicles. Each ride vehicle is configured to carry one or more riders through the amusement park ride system. In addition each ride vehicle includes an on-board ride and game control sub-system configured to control local features of the ride and game control system associated with the amusement park ride system. The local features of the ride and game control system occur locally on each respective ride vehicle. In addition, the on-board ride and game control sub-system of each respective ride vehicle is configured to locally cache player state data for one or more respective riders during one or more ride cycles of the ride vehicle, and to synchronize the locally-cached player state data with global player state data maintained by the off-board ride and game control sub-system after the one or more ride cycles of the ride vehicle.

In addition, in certain embodiments, an amusement park ride vehicle includes an on-board ride and game control sub-system configured to control local features of a ride and game control system associated with an amusement park ride system. The local features of the ride and game control system occur locally on the ride vehicle. In addition, the on-board ride and game control sub-system is configured to locally cache player state data for one or more riders of the ride vehicle during one or more ride cycles of the ride vehicle, and to synchronize the locally-cached player state data with global player state data after the one or more ride cycles of the ride vehicle. The global player state data is maintained by an off-board ride and game control sub-system configured to control global features of the ride and game control system associated with the amusement park ride system.

In addition, in certain embodiments, a method includes controlling, via an on-board ride and game control sub-system of a ride vehicle, local features of a ride and game control system associated with an amusement park ride system. The local features of the ride and game control system occur locally on the ride vehicle. The method also includes locally caching, via the on-board ride and game control sub-system of the ride vehicle, player state data for one or more riders of the ride vehicle during one or more ride cycles of the ride vehicle. The method further includes synchronizing, via the on-board ride and game control sub-system of the ride vehicle, the locally-cached player state data with global player state data after the one or more ride cycles of the ride vehicle. The global player state data is maintained by an off-board ride and game control sub-system configured to control global features of the ride and game control system associated with the amusement park ride system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to systems and methods for storing player state caches locally on ride vehicles. For example, ride vehicles may include an on-board ride and game control sub-system configured to control local features of a ride and game control system associated with an amusement park ride system (e.g., that occur locally on the ride vehicles), to locally cache player state data for riders of the ride vehicles during ride cycles of the ride vehicles, and to synchronize the locally-cached player state data with global player state data maintained by an off-board ride and game control sub-system after the ride cycles of the ride vehicles.

Figure 1:
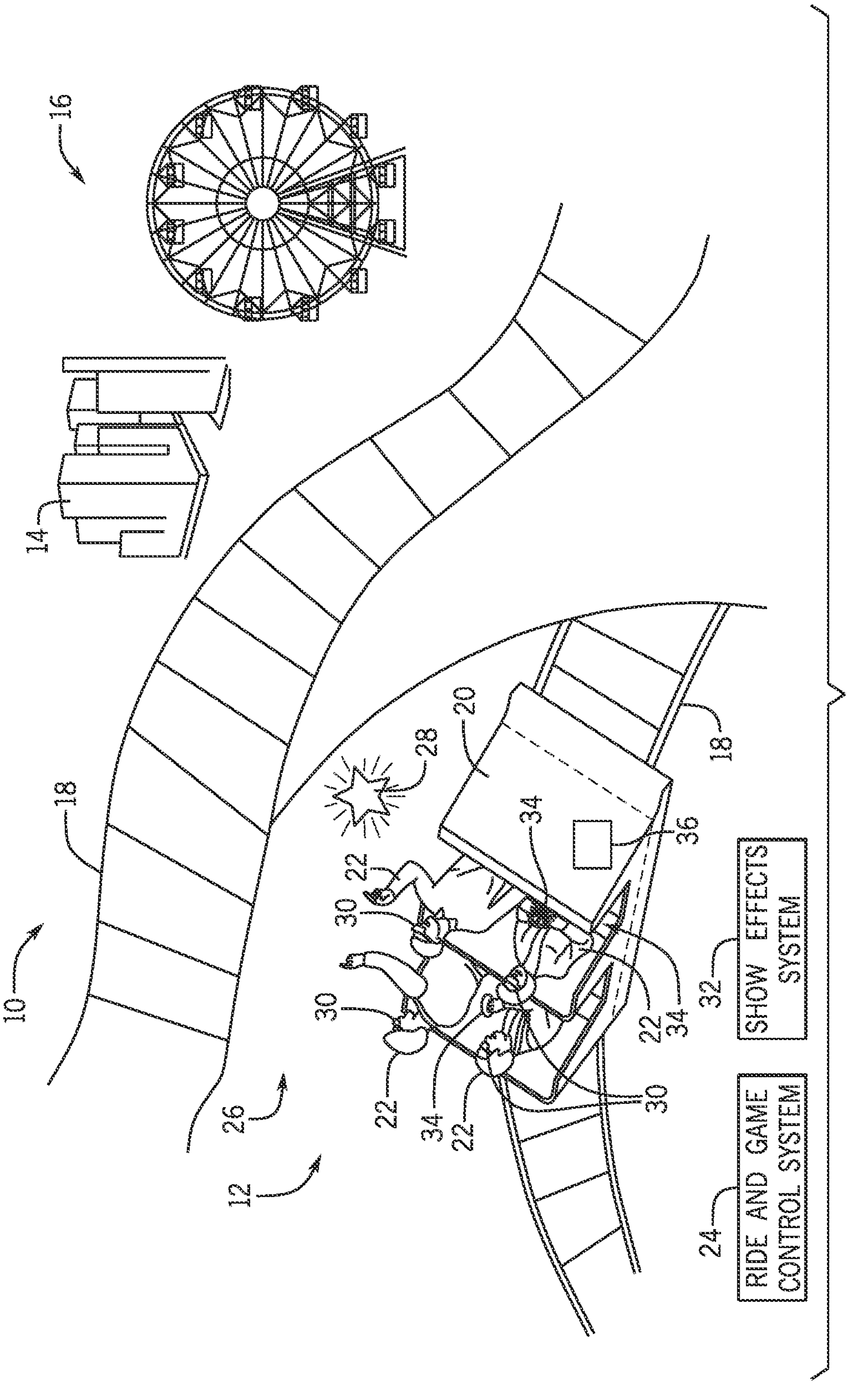
FIG. 1 is a schematic diagram of an embodiment of an amusement park including an amusement park ride system having a ride and game control system, in accordance with an embodiment of the present disclosure.

With the foregoing in mind, FIG. 1 illustrates a schematic diagram of an amusement park 10 including an amusement park ride system 12. As illustrated, in certain embodiments, the amusement park 10 may also include themed attractions 14 (e.g., fixed equipment, building layouts, props, decorations, and so forth corresponding to the theme) and other amusement park attractions 16 (e.g., Ferris wheel or other attractions). The amusement park ride system 12 may include a track or path 18 (e.g., a closed-loop track or a system of closed-loop tracks) that may provide an infrastructure along which a ride vehicle 20 may travel. The amusement park ride system 12 may include one or more ride vehicles 20, each of which may accommodate and carry one or more riders 22 through the amusement park ride system 12. While the ride vehicle 20 is shown as accommodating four riders 22, in other embodiments, the ride vehicle(s) 20 may each accommodate any number of riders (e.g., 1, 2, 3, 5, 6, or more). It should also be appreciated that while the amusement park ride system 12 is illustrated as having one ride vehicle 20, in other embodiments, the amusement park ride system 12 may include any number of ride vehicles 20 (e.g., 1, 2, 4, 8, 10, or more).

In certain embodiments, the track 18 may be a simple track or a controlled path, in which the movement of the ride vehicle 20 may be limited or controlled via an electronic system, a magnetic system, or other similar system. As described in greater detail herein, the movement of the ride vehicle 20 along the track 18 may be controlled by a control system (e.g., a ride and game control system 24 as illustrated in FIG. 1) of the ride vehicle 20, which may include multiple control systems in certain embodiments. In certain embodiments, as well as causing movement of the ride vehicle 20 along the track 18, the ride and game control system 24 may cause other motion of the ride vehicle 20, such as rotating, rocking, spinning, vibrating, pivoting, and other similar motions. In addition, in certain embodiments, the ride and game control system 24 may provide an augmented reality (AR) environment 26 of AR graphics including AR objects 28 presented to the riders 22 via head mounted displays 30 worn by the riders 22 throughout the duration of, or at least a portion of, the amusement park ride system 12. In addition, in certain embodiments, the ride and game control system 24 may further coordinate presentation of the AR objects 28 via the head mounted displays 30 and/or the movement of the ride vehicle 20 with other off-board effects, such as visual and/or sound presentations, provided by way of a show effects system 32 that may include a projection game computer, display devices (e.g., projection display devices, digital display devices), lighting systems, and sound effect devices (e.g., speakers) disposed along the track 18.

In certain embodiments, the amusement park ride system 12 may be presented as a game or gameplay interaction between the riders 22 of the ride vehicle 20, the AR environment 26 (e.g., gaming environment), including the AR objects 28, and/or one or more other ride vehicles 20 of the amusement park ride system 12. The AR objects 28 may include objects, characters, and instructions to the riders. For example, in certain embodiments, the game of the amusement park ride system 12 may be presented as a race between the ride vehicles 20 and/or between characters presented via the AR environment 26. In particular, in certain embodiments, as the ride vehicle 20 moves along the track 18, one rider 22 may control certain direct movements of the ride vehicle 20, such as steering and turning the ride vehicle 20, via a user input device 34. In certain embodiments, the user input device 34 may be communicatively coupled to the ride and game control system 24, which may cause movement of the ride vehicle 20 based at least in part on signals received from the user input device 34. Various AR objects 28 (including AR instructions) may be presented to the riders 22 throughout the duration of, or at least a portion of, the amusement park ride system 12 via the ride and game control system 24 and the head mounted displays 30.

In certain embodiments, the riders 22 may interact with the AR objects 28 presented via the head mounted displays 30, such as following instructions presented via the AR objects 28 or interacting with the AR objects 28 via the user input devices 34 (e.g., marking the AR objects 28 with AR projectiles). Such interaction with the AR environment 26 by the riders 22 may also trigger or affect movement of the ride vehicle 20 caused by the ride and game control system 24. As such, the ride and game control system 24 may provide divided control of the movement of the ride vehicle 20 triggered by direct user input from the riders 22 (e.g., steering wheel) and by virtual interaction of the riders 22 with the AR environment 26 (e.g., game environment), as discussed in greater detail herein. Thus, in certain embodiments, the ride and game control system 24 allows the riders 22 to directly and/or indirectly change the movement of their respective ride vehicle 20 to provide a more interactive ride experience that may vary during subsequent rides of the amusement park ride system 12.

In addition, as described in greater detail herein, the ride vehicle 20 may include an on-board ride and game control sub-system 36 that enables the storage of player state caches locally on the ride vehicle 20. In particular, in certain embodiments, the on-board ride and game control sub-system 36 of the ride vehicle 20 may be configured to locally cache player state data that is collected during a particular ride cycle of the ride vehicle 20 (e.g., during a set number of trips around the tracks 18 for the ride vehicle 20), which may be synchronized with global player state data that is stored in an off-board ride and game control sub-system of the ride and game control system 24, as described in greater detail herein. As such, riders 22 of the ride vehicle 20 may receive real-time game achievement results (e.g., during the particular ride cycle of the ride vehicle 20) instead of receiving such game achievement results only after the ride cycle of the ride vehicle 20 has completed. As described in greater detail herein, the on-board ride and game control sub-system 36 of the ride vehicle 20 may be configured to store relatively complex game logic locally on the particular ride vehicle 20, to receive global player state data before a particular ride cycle of the ride vehicle 20, to generate local player state data during a particular ride cycle of the ride vehicle 20 to, for example, track game achievements for riders 22 of the ride vehicle 20 during the particular ride cycle of the ride vehicle 20, to locally cache the locally generated player state data during the particular ride cycle of the ride vehicle 20, and to synchronize the locally-cached player state data with global player state data that is stored in an off-board ride and game control sub-system of the ride and game control system 24.

Figure 2:
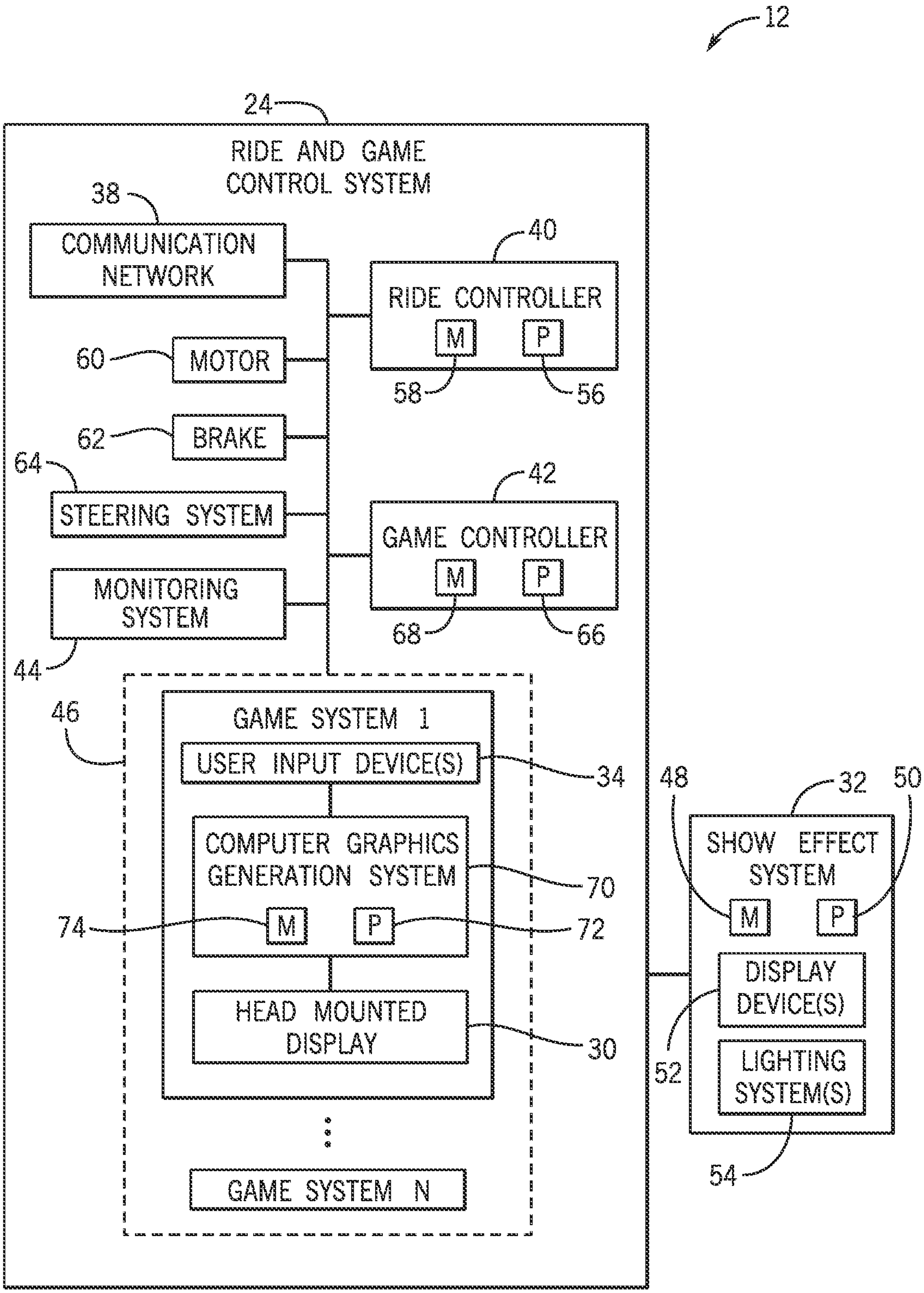
FIG. 2 is a block diagram of an embodiment of the ride and game control system that may be utilized within the amusement park ride system of FIG. 1, in accordance with an embodiment of the present disclosure.

As previously discussed, the ride and game control system 24 may provide divided control of the movement of the ride vehicle 20 to the riders 22 based at least in part on input signals received from the user input device(s) 34 related to steering of the ride vehicle 20, as well as based at least in part on the interactions of the riders 22 with the AR environment 26, which may be presented as a gameplay setting. FIG. 2 is a block diagram illustrating various components of the ride and game control system 24 described herein. As described in greater detail herein, the ride and game control system 24 may be partially integrated with the ride vehicle 20 (e.g., as part of the on-board ride and game control sub-system 36 of the ride vehicle 20 described with reference to FIG. 1) and configured to cooperate with an off-board ride and game control sub-system that, for example, at least partially coordinates the functionality of multiple on-board ride and game control sub-systems 36 of multiple ride vehicles 20. In other words, certain functionality of the ride and game control system 24 may be controlled locally on the individual ride vehicles 20 (e.g., by their respective on-board ride and game control sub-systems 36) while other functionality of the ride and game control system 24 may be controlled globally by an off-board ride and game control sub-system, as described in greater detail herein.

In certain embodiments, the ride and game control system 24 may include a communication network 38 (e.g., wired and/or wireless communication network, such as wireless local area networks [WLAN], wireless wide area networks [WWAN], and near field communication [NFC]), a ride controller 40, a game controller 42, a monitoring system 44, and one or more game systems 46. The show effects system 32 may include a memory 48 and a processor 50, a projection game computer, one or more display devices 52, one or more lighting systems 54, and other devices (e.g., sound systems, speakers) disposed along the tracks 18. As described in greater detail herein, the communication network 38 may communicatively couple the various on-board components of the ride vehicle 20 and the ride and game control system 24 (e.g., the ride controller 40, the game controller 42, the monitoring system 44, the one or more game systems 46, and so forth) to one another, as shown in the illustrated embodiment.

The ride controller 40 of the ride and game control system 24 may be a programmable logic controller (PLC), or other suitable control device. The ride controller 40 may include a processor 56 (e.g., a general-purpose processor, a system-on-chip (SoC) device, an application-specific integrated circuit (ASIC), or some other similar processor configuration) operatively coupled to a memory 58 (e.g., a tangible non-transitory computer-readable medium and/or other storage device) to execute instructions for tracking operational parameters of the ride vehicle 20 and instructions for causing movement of the ride vehicle 20. As such, the ride controller 40 may be configured to track operational parameters of the ride vehicle 20 including, but not limited to, position, yaw, pitch, roll, and velocity of the ride vehicle 20, and input control state (e.g., input provided by one or more of the riders 22 to steer and/or drive the ride vehicle 20). Additionally, the ride controller 40 may be configured to control or change physical operation of the ride vehicle 20 based on the input signals received from the user input devices 34 and/or the game controller 42 (e.g., to change the position, yaw, pitch roll, and the velocity of the ride vehicle 20). Based at least in part on the input signals received from the user input devices 34 and/or the game controller 42, the ride controller 40 may output one or more control signals to a motor 60, or a brake 62, and/or a steering system 64 of the ride vehicle 20 indicative of an instruction to perform the input movement, such as turn the ride vehicle 20, change the speed of the ride vehicle 20, rotate the ride vehicle 20, or other suitable movement.

The game controller 42 of the ride and game control system 24 may be a programmable logic controller (PLC), or other suitable control device. The game controller 42 may include a processor 66 (e.g., a general-purpose processor, a system-on-chip (SoC) device, an application-specific integrated circuit (ASIC), or some other similar processor configuration) operatively coupled to a memory 68 (e.g., a tangible non-transitory computer-readable medium and/or other storage device) to execute instructions stored in the memory 68. The game controller 42 may be configured to provide operational parameters or information relating to the ride vehicle 20 to the one or more game systems 46 and/or the ride controller 40. The operational parameters or information may include, but is not limited to, position, yaw, pitch roll, and the velocity of the ride vehicle 20. Additionally, the game controller 42 may be configured to determine and output signals to the one or more game systems 46 and/or the ride controller 40 indicative of how input signals received from the user input devices 34 should affect the movement of the ride vehicle 20. Thus, the game controller 42 may output instruction signals to the ride controller 40 indicative of particular movements associated with the input signals received via the user input devices 34. The game controller 42 may also coordinate the movement instructions output to the ride controller with control signals and parameters output to the one or more game systems 46 indicative of how the ride vehicle 20 will move in order to coordinate the AR environment 26 presented to the riders 22 via the head mounted displays 30 with the movement of the ride vehicle 20.

The monitoring system 44 may include any suitable sensors and/or computing systems disposed on or integrated with the ride vehicle 20 to track the positions, locations, orientations, presences, and so forth of the riders 22 and/or the position, location, or orientation of the ride vehicle 20. Such sensors may include orientation and position sensors (e.g., accelerometers, magnetometers, gyroscopes, Global Positioning System [GPS] receivers), motion tracking sensors (e.g., electromagnetic and solid-state motion tracking sensors), inertial measurement units (IMU), presence sensors, and others. The information obtained by the monitoring system 44 may be provided to the game controller 42, the one or more game systems 46, and/or the ride controller 40 for determining each rider's gaze direction, viewing perspective, field of view, interaction with the game, and so forth. In certain embodiments, the monitoring system 44 may also receive data obtained by the head mounted display 30 indicative of the respective rider's gaze direction, viewing perspective, field of view, interaction with the game, and so forth (e.g., position and orientation data of the head mounted display 30).

The one or more game systems 46 may include central processing units (CPUs) or other suitable system, and may generally be configured to render virtual or augmented graphics for overlay onto real-world environmental views. As such, the one or more game systems 46 may generate the AR environment 26 with which the riders 22 may interact in the gameplay setting. The one or more game systems 46 may also be responsible for game logic, and to run simulations of real-world ride vehicles and stage geometry for the placement of virtual objects in real space. In certain embodiments, the one or more game systems 46 are configured to provide AR and/or game play experiences to the riders 22 via the head mounted displays 30. In particular, in certain embodiments, each seat or position of the ride vehicle 20 may include a dedicated game system 46. In certain embodiments, the one or more game systems 46 may be communicatively coupled to one another, such that the passengers may engage in a shared game (e.g., a game having multiple players). The one or more game systems 46 may be communicatively coupled (directly or indirectly) to the ride controller 40, the game controller 42, the monitoring system 44, and so forth. Each of the one or more game systems 46 may include the user input device 34 or a group of multiple user input devices 34 and a computer graphics generation system 70. The user input devices 34 may be communicatively coupled to the computer graphics generation system 70, and the computer graphics generation system 70 may be communicatively coupled to the respective head mounted display 30.

In certain embodiments, the user input device(s) 34 may include one or more user input devices (e.g., handheld controllers, joysticks, push buttons) disposed on the ride vehicle 20 to enable the respective rider 22 to provide inputs to the ride controller 40, the game controller 42, and or the one or more game systems 46 for gameplay and to control movement of the ride vehicle 20, such as to change the velocity and/or direction of travel of the ride vehicle 20. The user input device(s) 34 may also be configured to interact with the AR objects 28 of the AR environment 26. The user input device 34 may include any other type of input devices configured to allow the riders 22 to interact with the AR environment (e.g., game environment) and/or to directly control operation of the ride vehicle 20, such as the accelerator user input device. Additionally, the user input device(s) 34 may be configured to allow different actions and/or effects to be applied in the AR environment 26. For example, the user input device(s) 34 may allow the riders 22 to control the AR objects 28 (e.g., character, object) of the AR environment 26 in different directions (e.g., up, down, left, right). In certain embodiments, the user input device(s) 34 may also include a display screen and/or a touch screen to enable ride and game related information to be communicated to the riders 22, such as information related to which user input device(s) 34 are currently activated for each rider 22 and/or gameplay instructions.

The computer graphics generation system 70 may generate and transmit AR graphics (e.g., the AR environment 26 including the AR objects 28) to be displayed on the respective head mounted display 30, such that the respective rider 22 may visualize the AR environment 26 (e.g., game environment). The computer graphics generation system 70 includes processing circuitry, such as a processor 72 (e.g., general purpose processor or other processor) and a memory 74, and may process data useful in generating the AR environment 26 for the respective rider 22. The data useful in generating the AR environment 26 may include, but is not limited to, real-time data received from the respective head mounted display 30, the user input device(s) 34, and the game controller 42 (e.g., including data from the ride controller 40 and the monitoring system 44), and data stored in the memory 74.

The computer graphics generation system 70 may use such data to generate a frame of reference to register the AR environment 26 to the real-world environment of the amusement park ride system 12, for example to generated real-world images or to the actual physical environment. Specifically, in certain embodiments, using the frame of reference generated based on orientation data, position data, point of view data, motion tracking data, and so forth, the computer graphics generation system 70 may render a view of the AR environment 26 in a manner that is temporally and spatially commensurate with what the respective rider 22 would perceive if not wearing the head mounted display 30. In certain embodiments, the computer graphics generation system 70 may store a model of the amusement park ride system 12 that is built using spatial information of the real-word physical features of the amusement park ride system 12 including the themed environment (e.g., physical scenery of the amusement park ride system 12). The model may be used, together with other inputs, such as inputs from the ride controller 40, the game controller 42, the monitoring system 44 and/or the head mounted display 30, to locate the respective rider 22 and determine the rider's gaze direction and/or field of view. The model may be used to provide display signals to the head mounted display 30 that are dynamically updated as the rider 22 travels along the track 18.

For example, the computer graphics generation system 70 may selectively generate AR graphics (e.g., the AR objects 28, including instruction objects) of the AR environment 26 to reflect changes in the respective rider's orientation, position, gaze direction, field of view, motion, and so forth. The computer graphics generation system 70 may selectively generate the AR environment 26 based on data indicative of the position, a yaw, and a velocity, and/or other operational parameters of the ride vehicle 20 received from the monitoring system 44, the game controller 42, and/or the ride controller 40. The computer graphics generation system 70 may also selectively generate the AR graphics to reflect changes in inputs provided by the respective passenger using the user input device(s) 34. Furthermore, the computer graphics generation system 70 may generate the AR graphics based on simulated interactions that may cause the AR objects 28 to be affected according to certain predetermined or modeled responses stored by the computer graphics generation system 70 (e.g., in the memory 74). As an example, the predetermined or modeled responses may be implemented by a physics engine or similar module or as a part of the computer graphics generation system 70. In certain embodiments, the computer graphics generation system 70 may track the information or data set forth above corresponding to a plurality of riders 22 in a shared game, such that the riders 22 in the shared game may see the game effects applied by other riders 22 (e.g., players) in the shared game.

Additionally, in certain embodiments, the computer graphics generations system 70 may receive input signals from the ride controller 40 and/or the game controller 42 indicative of the movement of the ride vehicle 20, such that the computer graphics generation system 70 may generate the AR environment 26 based at least in part on how the ride vehicle 20 is moving along or about the track 18. That is, the game controller 42 may determine, based at least in part on the inputs received from the user input devices 34 indicative of the interaction of the riders 22 with the AR environment 26, how the ride vehicle 20 should be moving in response to the inputs, and the game controller 42 may output signals to the computer graphics generation system 70 indicative of how the ride vehicle 20 will be moving in response to the rider interaction with the AR environment 26. As such, the computer graphics generation system 70 may generate the AR environment 26 based at least in part on how the ride vehicle 20 is being caused to move by the riders 22. Further, the computer graphics generation system 70 may receive signals from the ride controller 40 indicative of certain direct user inputs received from the user input devices 34 such that the computer graphics generation system 70 may further generate the AR environment 26 based at least in part on how the ride vehicle 20 is being caused to move by the riders 22.

As described in greater detail herein, certain ride vehicles 20 may be configured to locally cache player states for riders 22 that are automatically updated by the ride vehicle 20 during a ride cycle of the ride vehicle 20 to, for example, save the progress of the riders 22 during one or more games conducted by one or more game systems 46 of the ride and game control system 24. To that end, in certain embodiments, certain components of the ride and game control system 24 illustrated in FIG. 2 may be disposed on the ride vehicles 20 (e.g., as part of an on-board ride and game control sub-system 36), while other components of the ride and game control system 24 may not be disposed on the ride vehicles (e.g., as part of an off-board ride and game control sub-system 76), as described in greater detail herein. For example, FIG. 3 illustrates a ride vehicle 20 that includes, among other things, a ride controller 40, a game controller 42, a monitoring system 44, and one or more game systems 46, which may be collectively referred to as an on-board ride and game control sub-system 36 that provides local ride and game functionality for the ride vehicle 20 as part of a greater ride and game control system 24, which may also include an off-board ride and game control sub-system 76 that provides global ride and game functionality for multiple ride vehicles 20 as part of the ride and game control system 24.

For example, with reference to FIGS. 1 and 2, during a particular ride cycle of the ride vehicle 20 (e.g., as the ride vehicle 20 is moving along ride tracks 18), the on-board ride and game control sub-system 36 of a particular ride vehicle 20 may enable riders 22 of the ride vehicle 20 to provide inputs via the one or more user input devices 34, which may be used by the ride controller 40, the game controller 42, the monitoring system 44, and the one or more game systems 46 of the particular ride vehicle 20 to control or change physical operation of the ride vehicle 20, to send output signals to the computer graphics generation system 70 to control or change the AR environment 26 produced by the head mounted displays 30 of the ride vehicle 20, to monitor events occurring in one or more games conducted by the game controller 42 and the one or more game systems 46 of the ride vehicle 20, and so forth.

Figure 3:
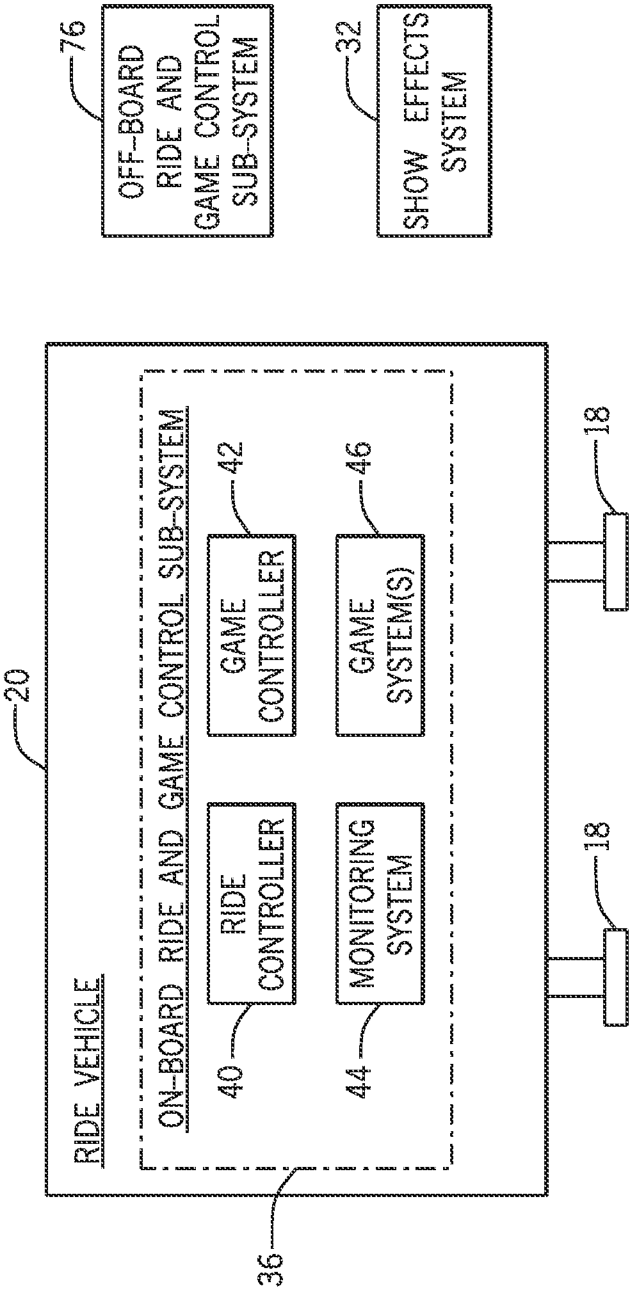
FIG. 3 illustrates a ride vehicle that includes, among other things, a ride controller, a game controller, a monitoring system, and one or more game systems, which may be collectively referred to as an on-board ride and game control sub-system, during a ride cycle of the ride vehicle, in accordance with an embodiment of the present disclosure.

In addition, as described in greater detail herein, as illustrated in FIG. 3, the on-board ride and game control sub-system 36 of the ride vehicle 20 enables the storage of player state caches locally on the ride vehicle 20, the data relating to which may be collected during a particular ride cycle of the ride vehicle 20, and may be synchronized with global player state data that is stored in the off-board ride and game control sub-system 76 of the ride and game control system 24 after the ride cycle of the ride vehicle 20 has completed. As such, riders 22 of the ride vehicle 20 may receive real-time game achievement results (e.g., during the particular ride cycle of the ride vehicle 20) instead of receiving such game achievement results only after the ride cycle of the ride vehicle 20 has completed. As described in greater detail herein, the on-board ride and game control sub-system 36 of the ride vehicle 20 may be configured to store relatively complex game logic locally on the particular ride vehicle 20, to receive global player state data before a particular ride cycle of the ride vehicle 20, to generate local player state data during a particular ride cycle of the ride vehicle 20 to, for example, track game achievements for riders 22 of the ride vehicle 20 during the particular ride cycle of the ride vehicle 20, to locally cache the locally generated player state data during the particular ride cycle of the ride vehicle 20, and to synchronize the locally-cached player state data with global player state data that is stored in the off-board ride and game control sub-system 76 of the ride and game control system 24.

Figure 4:
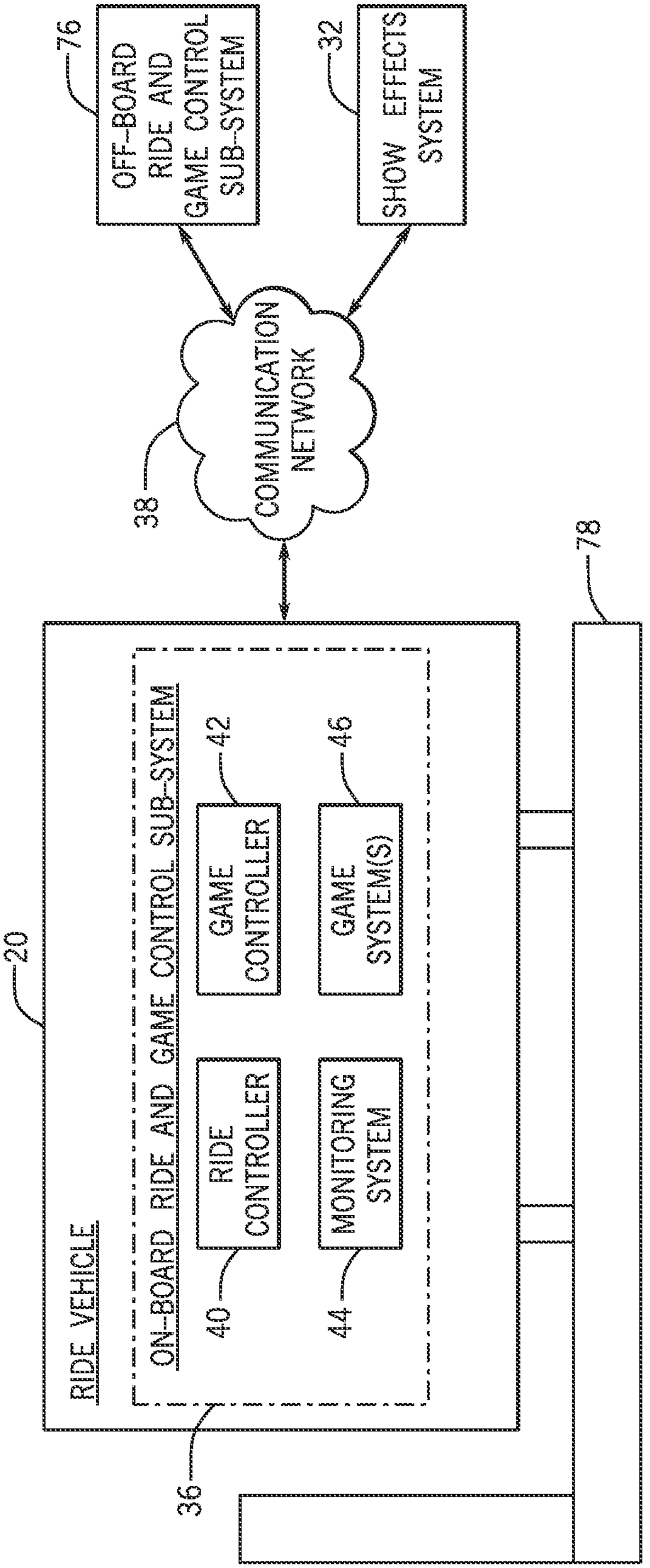
FIG. 4 illustrates the ride vehicle of FIG. 3 after the ride cycle of the ride vehicle, and during synchronization of locally-cached player state data with an off-board ride and game control sub-system, in accordance with an embodiment of the present disclosure.

As such, as illustrated in FIG. 3, the on-board ride and game control sub-system 36 of the ride vehicle 20 is configured to execute relatively complex game logic locally on the respective ride vehicle 20 without the need to communicate with external components of the ride and game control system 24 (i.e., not disposed on the respective ride vehicle 20, such as the off-board ride and game control sub-system 76 of the ride and game control system 24 or the show effects system 32) during any particular ride cycle of the ride vehicle 20 while still delivering a relatively robust gaming experience for the riders 22 of the ride vehicle 20, including tracking certain game-related achievements that might otherwise require access to data external to the ride vehicle 20. Rather, the on-board ride and game control sub-system 36 of the ride vehicle 20 is configured to locally cache player state data during particular ride cycle of the ride vehicle 20 and, at a later point in time (e.g., after the particular ride cycle, between successive ride cycles when the ride vehicle 20 is stationary and so forth), synchronize the locally-cached player state data with global player state data that is, for example, stored globally by the off-board ride and game control sub-system 76 of the ride and game control system 24, as described in greater detail herein. For example, as illustrated in FIG. 4, the on-board ride and game control sub-system 36 of the ride vehicle 20 may be configured to synchronize the locally-cached player state data with the global player state data stored in the off-board ride and game control sub-system 76 (e.g., via the communication network 38) only when the ride vehicle has come to a complete stop, for example, at a loading/unloading spot 78 (e.g., between ride cycles of the ride vehicle 20).

In addition, as will be appreciated, to minimize the amount of data that is needed to be communicated between the on-board ride and game control sub-system 36 of the ride vehicle 20 and the off-board ride and game control sub-system 76 to synchronize the locally-cached player state data and the global player state data, the on-board ride and game control sub-system 36 of the ride vehicle 20 may be configured to determine only a subset of the locally-cached player state data that needs to be synchronized with the global player state data. For example, in certain embodiments, the on-board ride and game control sub-system 36 of the ride vehicle 20 may be configured to identify only certain data of the locally-cached player state data that are considered to be important to the global game and ride functionality provided by the off-board ride and game control sub-system 76 and the show effects system 32. As but one non-limiting example, in certain embodiments, the on-board ride and game control sub-system 36 of the ride vehicle 20 may only synchronize certain data of the locally-cached player state data that has changed by a predetermined threshold amount during a particular ride cycle of the ride vehicle 20. For example, if a particular rider 22 of the ride vehicle 20 scores in excess of a minimum threshold amount of points in a particular ride cycle of the ride vehicle 20, the on-board ride and game control sub-system 36 of the ride vehicle 20 may synchronize the achievement of this amount of points with the global player state data stored in the off-board ride and game control sub-system 76 and the show effects system 32. Conversely, if the particular rider 22 of the ride vehicle 20 does not score in excess of a certain threshold amount of points in the particular ride cycle of the ride vehicle 20, it may be assumed that the particular rider 22 scored the minimum threshold amount of points. As such, such, whether or not to transmit certain locally-cached player state data to the off-board ride and game control sub-system 76 is dependent upon the on-board ride and game control sub-system 36 of the ride vehicle 20 determining that the particular subset of locally-cached player state data is statistically significant enough to be considered by the off-board ride and game control sub-system 76.

In addition, in certain embodiments, the on-board ride and game control sub-system 36 of the ride vehicle 20 may periodically query the off-board ride and game control sub-system 76 to synchronize at least a portion of the global player state data stored in the off-board ride and game control sub-system 76 down to the on-board ride and game control sub-system 36 before a subsequent ride cycle of the ride vehicle 20. Similar decision-making regarding the relevant significance of the data may be determined by the off-board ride and game control sub-system 76 when an on-board ride and game control sub-system 36 requests such synchronization.

Figure 5:
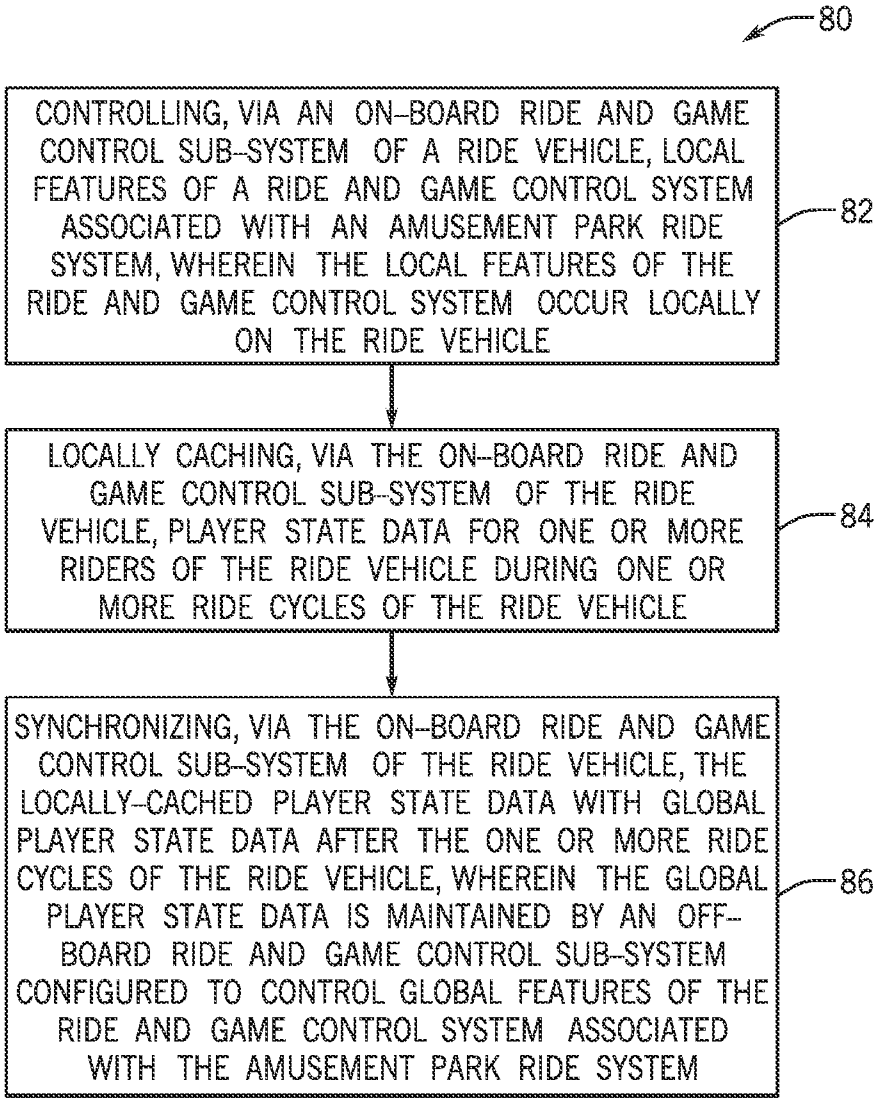
FIG. 5 is a flow diagram of a method of using an on-board ride and game control sub-system of a ride vehicle, in accordance with an embodiment of the present disclosure.

FIG. 5 is a flow diagram of a method 80 of using an on-board ride and game control sub-system 36 of a ride vehicle 20. As illustrated, in certain embodiments, the method 80 includes controlling, via an on-board ride and game control sub-system 36 of a ride vehicle 20, local features of a ride and game control system 24 associated with an amusement park ride system 12, wherein the local features of the ride and game control system 24 occur locally on the ride vehicle 20 (block 82). In addition, in certain embodiments, the method 80 includes locally caching, via the on-board ride and game control sub-system 36 of the ride vehicle 20, player state data for one or more riders 22 of the ride vehicle 20 during one or more ride cycles of the ride vehicle 20 (block 84). In addition, in certain embodiments, the method 80 includes synchronizing, via the on-board ride and game control sub-system 36 of the ride vehicle 20, the locally-cached player state data with global player state data after the one or more ride cycles of the ride vehicle 20, wherein the global player state data is maintained by an off-board ride and game control sub-system 76 configured to control global features of the ride and game control system 24 associated with the amusement park ride system 12 (block 86).

In addition, in certain embodiments, the locally-cached player state data synchronized with the global player state data by the on-board ride and game control sub-system 36 after the one or more ride cycles of the ride vehicle 20 includes only a subset of player state data collected by the on-board ride and game control sub-system 36 during the one or more ride cycles of the ride vehicle 20, as described in greater detail herein. Similarly, in certain embodiments, the method 80 includes synchronizing, via the on-board ride and game control sub-system 36 of the ride vehicle 20, at least a portion of the global player state data with the locally-cached player state data before subsequent ride cycles of the ride vehicle 20, as described in greater detail herein.

In addition, in certain embodiments, the method 80 includes controlling, via the on-board ride and game control sub-system 36 of the ride vehicle, 20 the local features of the ride and game control system 24 associated with the amusement park ride system 12 without communicating with the off-board ride and game control sub-system 76 during the one or more ride cycles of the ride vehicle 20, as described in greater detail herein. In addition, in certain embodiments, the method 80 includes determining, via the on-board ride and game control sub-system 36 of the ride vehicle 20, one or more game-related achievements for the one or more riders 22 during the one or more ride cycles of the ride vehicle 20 based at least in part on the locally-cached player state data, and communicating, via the on-board ride and game control sub-system 36 of the ride vehicle 20, the one or more game-related achievements to the one or more riders 22 during the one or more ride cycles of the ride vehicle 20, as described in greater detail herein.

In addition, in certain embodiments, the method 80 includes changing, via the on-board ride and game control sub-system 36 of the ride vehicle 20, movement of the ride vehicle 20 during the one or more ride cycles of the ride vehicle 20 based at least in part on the locally-cached player state data, as described in greater detail herein. In addition, in certain embodiments, the method 80 includes changing, via the on-board ride and game control sub-system 36 of the ride vehicle 20, the presentation of an AR environment 26 to the one or more riders 22 during the one or more ride cycles of the ride vehicle 20 based at least in part on the locally-cached player state data, as described in greater detail herein.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. An amusement park ride system, comprising:

an off-board ride and game control sub-system configured to control global features of a ride and game control system associated with the amusement park ride system; and one or more ride vehicles, wherein each ride vehicle is configured to carry one or more riders through the amusement park ride system, and wherein each ride vehicle comprises an on-board ride and game control sub-system configured to control local features of the ride and game control system associated with the amusement park ride system without communicating with the off-board ride and game control sub-system during one or more ride cycles of the ride vehicle, wherein the local features of the ride and game control system occur locally on each respective ride vehicle, and wherein the on-board ride and game control sub-system of each respective ride vehicle is configured to locally cache player state data for one or more respective riders during the one or more ride cycles of the ride vehicle, to execute game logic locally on the ride vehicle to deliver a game experience to the one or more riders of the ride vehicle during the one or more ride cycles of the ride vehicle based at least in part on the locally-cached player state data without communicating with the off-board ride and game control sub-system and without accessing data external to the ride vehicle, to change an augmented reality (AR) environment presented as part of the game experience to the one or more riders during the one or more ride cycles of the ride vehicle based at least in part on the locally-cached player state data without communicating with the off-board ride and game control sub-system and without accessing data external to the ride vehicle, and to synchronize the locally-cached player state data with global player state data maintained by the off-board ride and game control sub-system after the one or more ride cycles of the ride vehicle.

2. The amusement park ride system of claim 1, wherein the locally-cached player state data synchronized with the global player state data by each respective on-board ride and game control sub-system after the one or more ride cycles of the respective ride vehicle comprises only a subset of player state data collected by the on-board ride and game control sub-system during the one or more ride cycles of the respective ride vehicle.

3. The amusement park ride system of claim 1, wherein the on-board ride and game control sub-system of each respective ride vehicle is configured to synchronize at least a portion of the global player state data with the locally-cached player state data before subsequent ride cycles of the ride vehicle.

4. The amusement park ride system of claim 1, wherein the on-board ride and game control sub-system of each respective ride vehicle is configured to determine one or more game-related achievements for the one or more respective riders during the one or more ride cycles of the ride vehicle based at least in part on the locally-cached player state data, and to communicate the one or more game-related achievements to the one or more respective riders during the one or more ride cycles of the ride vehicle.

5. The amusement park ride system of claim 1, wherein the on-board ride and game control sub-system of each respective ride vehicle is configured to change movement of the ride vehicle during the one or more ride cycles of the ride vehicle based at least in part on the locally-cached player state data.

6. The amusement park ride system of claim 1, wherein the on-board ride and game control sub-system of each respective ride vehicle is configured to change a presentation of an augmented reality environment to the one or more respective riders during the one or more ride cycles of the ride vehicle based at least in part on the locally-cached player state data.

7. An amusement park ride vehicle, comprising:

an on-board ride and game control sub-system configured to control local features of a ride and game control system associated with an amusement park ride system without communicating with an off-board ride and game control sub-system configured to control global features of the ride and game control system associated with the amusement park ride system, wherein the local features of the ride and game control system occur locally on the ride vehicle, and wherein the on-board ride and game control sub-system is configured to locally cache player state data for one or more riders of the ride vehicle during one or more ride cycles of the ride vehicle, to execute game logic locally on the ride vehicle to deliver a game experience to the one or more riders of the ride vehicle during the one or more ride cycles of the ride vehicle based at least in part on the locally-cached player state data without communicating with the off-board ride and game control sub-system and without accessing data external to the ride vehicle, to change an augmented reality (AR) environment presented as part of the game experience to the one or more riders during the one or more ride cycles of the ride vehicle based at least in part on the locally-cached player state data without communicating with the off-board ride and game control sub-system and without accessing data external to the ride vehicle, and to synchronize the locally-cached player state data with global player state data after the one or more ride cycles of the ride vehicle, wherein the global player state data is maintained by the off-board ride and game control sub-system.

8. The amusement park ride vehicle of claim 7, wherein the locally-cached player state data synchronized with the global player state data by the on-board ride and game control sub-system after the one or more ride cycles of the ride vehicle comprises only a subset of player state data collected by the on-board ride and game control sub-system during the one or more ride cycles of the ride vehicle.

9. The amusement park ride vehicle of claim 7, wherein the on-board ride and game control sub-system is configured to synchronize at least a portion of the global player state data with the locally-cached player state data before subsequent ride cycles of the ride vehicle.

10. The amusement park ride vehicle of claim 7, wherein the on-board ride and game control sub-system is configured to determine one or more game-related achievements for the one or more riders during the one or more ride cycles of the ride vehicle based at least in part on the locally-cached player state data, and to communicate the one or more game-related achievements to the one or more riders during the one or more ride cycles of the ride vehicle.

11. The amusement park ride vehicle of claim 7, wherein the on-board ride and game control sub-system is configured to change movement of the ride vehicle during the one or more ride cycles of the ride vehicle based at least in part on the locally-cached player state data.

12. The amusement park ride vehicle of claim 7, wherein the on-board ride and game control sub-system is configured to change a presentation of an augmented reality environment to the one or more riders during the one or more ride cycles of the ride vehicle based at least in part on the locally-cached player state data.

13. A method, comprising:

controlling, via an on-board ride and game control sub-system of a ride vehicle, local features of a ride and game control system associated with an amusement park ride system without communicating with an off-board ride and game control sub-system configured to control global features of the ride and game control system associated with the amusement park ride system, wherein the local features of the ride and game control system occur locally on the ride vehicle;

locally caching, via the on-board ride and game control sub-system of the ride vehicle, player state data for one or more riders of the ride vehicle during one or more ride cycles of the ride vehicle;

executing, via the on-board ride and game control sub-system of the ride vehicle, game logic locally on the ride vehicle to deliver a game experience to the one or more riders of the ride vehicle during the one or more ride cycles of the ride vehicle based at least in part on the locally-cached player state data without communicating with the off-board ride and game control sub-system and without accessing data external to the ride vehicle;

changing, via the on-board ride and game control sub-system of the ride vehicle, an augmented reality (AR) environment presented as part of the game experience to the one or more riders during the one or more ride cycles of the ride vehicle based at least in part on the locally-cached player state data without communicating with the off-board ride and game control sub-system and without accessing data external to the ride vehicle, and synchronizing, via the on-board ride and game control sub-system of the ride vehicle, the locally-cached player state data with global player state data after the one or more ride cycles of the ride vehicle, wherein the global player state data is maintained by the off-board ride and game control sub-system.

14. The method of claim 13, wherein the locally-cached player state data synchronized with the global player state data by the on-board ride and game control sub-system after the one or more ride cycles of the ride vehicle comprises only a subset of player state data collected by the on-board ride and game control sub-system during the one or more ride cycles of the ride vehicle.

15. The method of claim 13, comprising synchronizing, via the on-board ride and game control sub-system of the ride vehicle, at least a portion of the global player state data with the locally-cached player state data before subsequent ride cycles of the ride vehicle.

16. The method of claim 13, comprising:

determining, via the on-board ride and game control sub-system of the ride vehicle, one or more game-related achievements for the one or more riders during the one or more ride cycles of the ride vehicle based at least in part on the locally-cached player state data; and communicating, via the on-board ride and game control sub-system of the ride vehicle, the one or more game-related achievements to the one or more riders during the one or more ride cycles of the ride vehicle.

17. The method of claim 13, comprising changing, via the on-board ride and game control sub-system of the ride vehicle, movement of the ride vehicle during the one or more ride cycles of the ride vehicle based at least in part on the locally-cached player state data.

18. The method of claim 13, comprising changing, via the on-board ride and game control sub-system of the ride vehicle, a presentation of an augmented reality environment to the one or more riders during the one or more ride cycles of the ride vehicle based at least in part on the locally-cached player state data.

* * * * *